Patented Dec. 1, 1953

2,661,351

UNITED STATES PATENT OFFICE 2,661,351

N-ALKYL - 9 - XANTHENE-CARBOXAMIDES, BASICALLY SUBSTITUTED DERIVATIVES AND SALTS THEREOF

John W. Cusic, Skokie, Ill., assignor to G. D. Searle & Co., Chicago, Ill., a corporation of Illinois No Drawing. Application July 24, 1951, Serial No. 238,400

9 Claims. (Cl. 260—247.2)

The present invention relates to a new class of organic heterocyclic compounds and more particularly to the N-monosubstituted 9-xanthenecarboxamides and salts thereof. These compounds can be represented by the structural formula

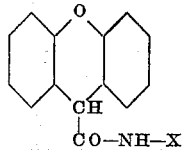

wherein X is a lower aliphatic hydrocarbon radical or a simple substitution product thereof.

Of special interest are the basically substituted derivatives of 9-xanthenecarboxamide and their salts which can be represented by the structural formula

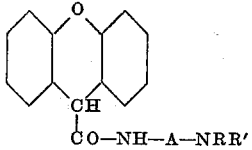

In this formula R and R' may represent such lower alkyl radicals as methyl, ethyl, propyl, butyl, amyl, and hexyl, wherein the propyl, butyl, amyl and hexyl radicals may be of the straight-chain or branch-chain type, and cycloalkyl radicals as cyclobutyl, cyclopentyl, and cyclohexyl.

The radical A represents a lower bivalent, saturated, aliphatic hydrocarbon radical, derived from a straight-chain or branched chain hydrocarbon and which includes radicals such as ethylene, propylene, butylene, amylene, hexylene and polymethylene radicals such as trimethylene, tetramethylene, pentamethylene and hexamethylene.

In the radical NRR', R and R' may represent such lower alkyl radicals as defined hereinabove. The radical NRR' may also represent a nitrogen containing monocyclic radical such as piperidino, lupetidino, pyrrolidino, 2,5-dimethylpyrrolidino, morpholino, thiamorpholino, piperazino, and N'-alkylpiperazino.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic, and aromatic sufonic acids. Among such esters are methyl chloride and bromide, ethyl chloride, propyl chloride, butyl chloride, isobutyl chloride, benzyl chloride and bromide; phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The compounds which constitute this invention are valuable as intermediates in organic synthesis. Certain of them, and in particular the basically substituted alkyl derivatives, have been found to possess a number of highly useful pharmacodynamic properties. These have a pronounced effect on the cardiovascular and renal system. The quaternary salts are active as inhibitors of autonomic nervous function.

In the preparation of these 9-xanthenecarboxamides I prefer to heat a halide of 9-xanthenecarboxylic acid with an appropriate amine of the structure X—NH₂, X being defined as hereinabove, in an inert anhydrous organic solvent such as a lower aromatic hydrocarbon or lower aliphatic ketone. In the case of the basic derivatives, the resulting hydrohalide is isolated conveniently by extraction with a mineral acid.

My invention will be described more fully in conjunction with the following examples. It should be understood, however, that these examples are given by way of illustration only and that the invention is not to be construed as limited in spirit or in scope by the details set forth. It will be apparent to those skilled in the art that many modifications in materials and methods may be made without departing from the invention. In each of these examples temperatures are given uncorrected in degrees centigrade (°C.) and quantities of materials in parts by weight.

EXAMPLE 1

*N-(n-hexyl)-9-xanthenecarboxamide*

488 parts of 9-xanthenecarboxylic acid chloride and 200 parts of n-hexylamine are mixed in 3000 parts of butanone. A vigorous reaction occurs at once. On subsidence of the initial reaction, the mixture is heated to boiling under a reflux condenser for two hours. After cooling the mixture is treated with dilute hydrochloric acid and the organic layer is separated, dried over anhydrous potassium carbonate, stirred with decolorizing charcoal, filtered and evaporated. The N-(n-hexyl)-9-xanthenecarboxamide thus obtained has the structural formula

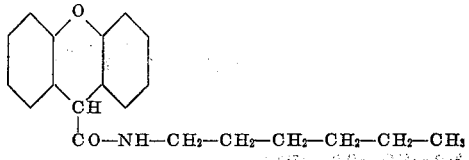

EXAMPLE 2

*N-(β-diethylaminoethyl)-9-xanthene-carboxamide*

488 parts of 9-xanthenecarboxylic acid chloride are mixed with 232 parts of 1-diethylamino-2-aminoethane in 3500 parts of benzene and heated at refluxing temperature for two hours. The solvent is then evaporated and the residue dissolved in a warm highly diluted hydrochloric acid solution. The solution is filtered through charcoal and the filtrate cooled and rendered alkaline. The resulting precipitate is dissolved in warm benzene and treated with a 10% solution of hydrogen chloride in anhydrous isopropanol. Upon treatment with ether an oily precipitate forms which is separated and crystallized from a mixture of ethyl acetate and isopropanol. The resultant hydrochloride of the N-(β-diethylaminoethyl)-9-xanthenecarboxamide melts at about 137–138° C. It has the structural formula

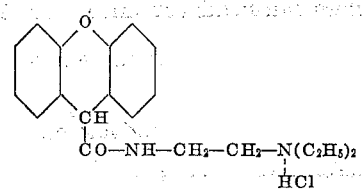

EXAMPLE 3

*β-(9-xanthenecarboxamidoethyl) diethylmethyl-ammonium bromide*

The hydrochloride of N-(β-diethylaminoethyl)-9-xanthenecarboxamide is converted into the free base by treatment with sodium hydroxide, extraction with ether and evaporation. 100 parts of base thus obtained are heated with 100 parts of methyl bromide in 400 parts of anhydrous butanone in a shielded pressure reactor at 80° C. for two hours. A heavy precipitate forms. After cooling the β-(9-xanthenecarboxamidoethyl) diethylmethylammonium bromide is collected on a filter. Upon recrystallization from isopropanol it melts at about 185–186° C. It has the structural formula

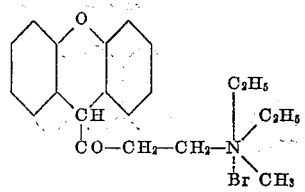

EXAMPLE 4

*N-(γ-dimethylaminopropyl)-9-xanthene-carboxamide*

244 parts of 9-xanthenecarboxylic acid chloride are mixed with 102 parts of 1-dimethylamino-3-aminopropane and 1600 parts of butanone. There is an immediate and vigorous reaction and formation of a precipitate. Upon subsidence of the reaction the mixture is heated for two hours at reflux temperature. After cooling the precipitate is collected on a filter and recrystallized from dilute isopropanol. The resulting hydrochloride of N-(γ-dimethylaminopropyl)-9-xanthenecarboxamide melts at about 217–218° C. It has the structural formula

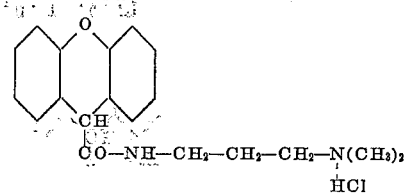

EXAMPLE 5

*N-(γ-diethylaminopropyl)-9-xanthene-carboxamide*

Upon mixing of 244 parts of 9-xanthenecarboxylic acid chloride with 130 parts of 1-diethylamino-3-aminopropane in 1600 parts of butanone there is a vigorous reaction resulting in the formation of a precipitate. The mixture is heated at reflux temperature for two hours and then treated with dilute hydrochloric acid and toluene and the aqueous layer is separated and rendered alkaline by treatment with a dilute solution of potassium hydroxide. The N-(γ-diethylaminopropyl)-9-xanthenecarboxamide precipitates, is collected on a filter and washed well with water. Upon recrystallization from isopropanol and decolorization with charcoal, colorless crystals are obtained which melt at about 159–160° C. The base has the structural formula

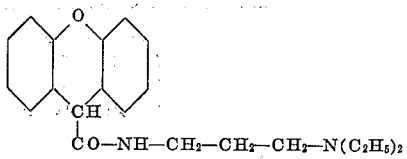

EXAMPLE 6

*N-(β-morpholinoethyl)-9-xanthenecarboxamide*

A mixture of 244 parts of 9-xanthenecarboxylic acid chloride and 139 parts of 4-(β-aminoethyl)-morpholine in 1600 parts of butanone is heated for three hours at reflux temperature. A heavy solid precipitate forms which is collected on a filter and crystallized from dilute isopropanol. The resulting hydrochloride of N-(β-morpholinoethyl)-9-xanthenecarboxamide melts at about 171–172° C. It has the structural formula

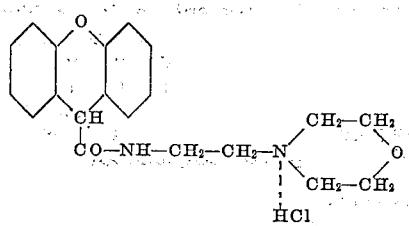

EXAMPLE 7

*N-(γ-morpholinopropyl)-9-xanthenecarboxamide*

A mixture of 244 parts of 9-xanthenecarboxylic acid chloride and 153 parts of 4-(γ-aminopropyl)morpholine in 1600 parts of butanone is heated for four hours at reflux temperature and permitted to stand at room temperature. The resulting precipitate is dissolved in dilute hydrochloric acid and the solution rendered alkaline whereupon the N-(γ-morpholinopropyl)-9-xanthenecarboxamide precipitates. The latter is insoluble in most of the common organic solvents. It is suspended in isopropanol and treated with an excess of alcoholic hydrogen chloride. Sufficient water is added to cause the entire mass to enter into solution on boiling. Upon cooling the hydrochloride precipitates which melts at 242–244° C. The base has the structural formula

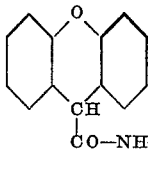

EXAMPLE 8

*N-(δ-piperidinobutyl)-9-xanthenecarboxamide*

A mixture of 244 parts of 9-xanthenecarboxylic acid chloride and 165 parts of 1-(δ-aminobutyl)-piperidine in 1600 parts of butanone is stirred whereupon a vigorous reaction occurs with formation of a solid precipitate. The mixture is heated at reflux temperature for four hours and then permitted to cool. The hydrochloride of N-(δ-piperidinobutyl)-9-xanthenecarboxamide thus obtained is collected on a filter and dissolved in dilute hydrochloric acid solution. This solution is washed with ether and then rendered alkaline by treatment with ammonium hydroxide. The N-(δ-piperidinobutyl)-9-xanthenecarboxamide precipitates; it has a structural formula

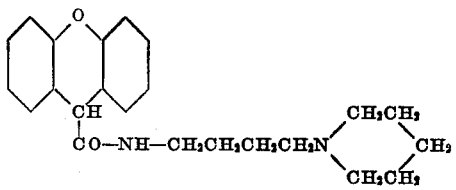

I claim:

1. A member of the class consisting of 9-xanthenecarboxamides of the structural formula

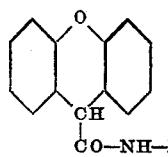

and salts thereof, wherein X is a member of the class consisting of, lower dialkylaminoalkyl, lower morpholinoalkyl, and lower piperidinoalkyl radicals.

2. The N-dialkylaminoalkyl-9-xanthenecarboxamides of the structural formula

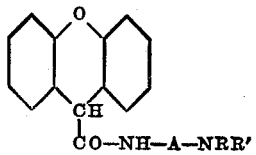

wherein A is a lower saturated bivalent aliphatic hydrocarbon radical containing at least two carbon atoms and R and R' are lower alkyl radicals.

3. The 9-xanthenecarboxamidoalkyltrialkylammonium salts of the structural formula

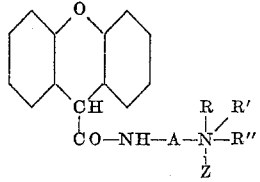

wherein A is a lower saturated bivalent aliphatic hydrocarbon radical containing at least two carbon atoms, R, R' and R'' are lower alkyl radicals, and Z is one equivalent of an anion.

4. The halides of 9-xanthenecarboxamidoalkyltrialkylammonium salts of the structural formula

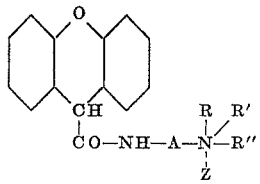

wherein A is a lower saturated bivalent aliphatic hydrocarbon radical containing at least two carbon atoms, R, R' and R'' are lower alkyl radicals, and Z is a halide ion.

5. The N-morpholinoalkyl-9-xanthenecarboxamides of the structural formula

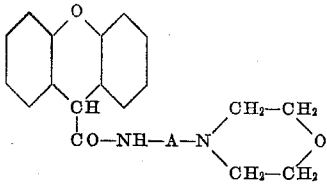

wherein A is a lower saturated bivalent aliphatic hydrocarbon radical containing at least two carbon atoms.

6. The N-piperidinoalkyl-9-xanthenecarboxamides of the structural formula

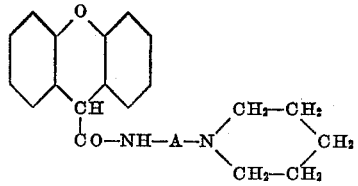

wherein A is a lower saturated bivalent aliphatic hydrocarbon radical containing at least two carbon atoms.

7. N-(β-diethylaminoethyl)-9-xanthenecarboxamide.

8. N-(γ-diethylaminopropyl)-9-xanthenecarboxamide.

9. The β-(9-xanthenecarboxamidoethyl)diethylmethylammonium halides of the structural formula

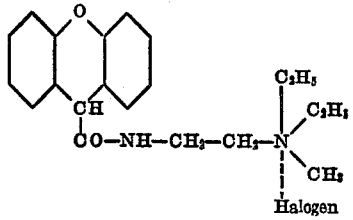

JOHN W. CUSIC.

No references cited.